United States Patent
Pazdziora et al.

(10) Patent No.: US 9,154,305 B2
(45) Date of Patent: *Oct. 6, 2015

(54) STATE-BASED COMPLIANCE VERIFICATION IN A CONNECTED SYSTEM

(75) Inventors: Jan Pazdziora, Brno (CZ); Tomáš Mráz, Tábor (CZ)

(73) Assignee: Red Hat, Inc., Raleigh, NC (US)

( * ) Notice: Subject to any disclaimer, the term of this patent is extended or adjusted under 35 U.S.C. 154(b) by 886 days.

This patent is subject to a terminal disclaimer.

(21) Appl. No.: 12/784,255

(22) Filed: May 20, 2010

(65) Prior Publication Data

US 2011/0289002 A1    Nov. 24, 2011

(51) Int. Cl.
| | |
|---|---|
| G06Q 99/00 | (2006.01) |
| H04L 9/32 | (2006.01) |
| G06F 21/33 | (2013.01) |
| G06F 21/60 | (2013.01) |
| G06F 21/73 | (2013.01) |
| G06Q 30/00 | (2012.01) |
| G06Q 50/00 | (2012.01) |
| G06F 21/10 | (2013.01) |
| H04L 29/06 | (2006.01) |

(52) U.S. Cl.
CPC .............. *H04L 9/3236* (2013.01); *G06F 21/33* (2013.01); *G06F 21/606* (2013.01); *G06F 21/73* (2013.01); *H04L 9/3297* (2013.01); *G06F 21/10* (2013.01); *G06F 21/105* (2013.01); *G06F 2221/2101* (2013.01); *G06F 2221/2107* (2013.01); *G06F 2221/2115* (2013.01); *G06F 2221/2151* (2013.01); *G06Q 30/00* (2013.01); *G06Q 50/00* (2013.01); *G06Q 2220/10* (2013.01); *G06Q 2220/18* (2013.01); *H04L 63/123* (2013.01); *H04L 2463/121* (2013.01)

(58) Field of Classification Search
CPC ... G06F 21/05; G06F 21/105; G06Q 2220/18; G06Q 2220/10; G06Q 50/00; G06Q 30/00
USPC ..................................... 705/59; 709/223, 224
See application file for complete search history.

(56) References Cited

U.S. PATENT DOCUMENTS

| | | | |
|---|---|---|---|
| 7,024,695 B1 * | 4/2006 | Kumar et al. .................... 726/26 |
| 7,055,008 B2 * | 5/2006 | Niles et al. ..................... 711/162 |
| 7,155,414 B2 * | 12/2006 | Barritz et al. .................... 705/59 |
| 7,684,067 B2 * | 3/2010 | Smithson ..................... 358/1.14 |
| 7,904,450 B2 * | 3/2011 | Wilson .......................... 707/723 |
| 7,949,877 B2 | 5/2011 | Hug | |

(Continued)

OTHER PUBLICATIONS

Red Hat Restriction Requirement for U.S. Appl. No. 12/784,274, mailed Jan. 17, 2012.

(Continued)

*Primary Examiner* — James D Nigh
(74) *Attorney, Agent, or Firm* — Lowenstein Sandler LLP

(57) ABSTRACT

Some embodiments of a system and a method to verify compliance in a connected system have been presented. For instance, a system management server provided by a software vendor is installed in a customer's network to manage a set of computer systems belonging to the customer. The system management server can provide cryptographically timestamped hashes of states of the system management server to the software vendor periodically to allow the software vendor to verify compliance information from the customer.

18 Claims, 6 Drawing Sheets

(56) References Cited

U.S. PATENT DOCUMENTS

| | | | |
|---|---|---|---|
| 8,086,859 B2* | 12/2011 | Pavlicic | 713/176 |
| 8,375,450 B1* | 2/2013 | Oliver et al. | 726/24 |
| 8,719,386 B2* | 5/2014 | Lyman et al. | 709/221 |
| 2002/0065780 A1* | 5/2002 | Barritz et al. | 705/59 |
| 2004/0054908 A1 | 3/2004 | Circenis | |
| 2004/0143713 A1* | 7/2004 | Niles et al. | 711/162 |
| 2005/0160095 A1 | 7/2005 | Dick et al. | |
| 2007/0208944 A1* | 9/2007 | Pavlicic | 713/176 |
| 2008/0086754 A1 | 4/2008 | Chen et al. | |
| 2008/0123124 A1* | 5/2008 | Smithson | 358/1.13 |
| 2008/0141365 A1* | 6/2008 | Soegtrop | 726/21 |
| 2009/0100041 A1* | 4/2009 | Wilson | 707/5 |
| 2011/0288973 A1* | 11/2011 | Pazdziora et al. | 705/34 |

OTHER PUBLICATIONS

Red Hat Office Action for U.S. Appl. No. 12/784,274, mailed Mar. 1, 2012.

* cited by examiner

STATE-BASED COMPLIANCE VERIFICATION IN A CONNECTED SYSTEM

TECHNICAL FIELD

Embodiments of the present invention relate to software, and more specifically to compliance verification in sale or licensing of digital products, such as software, music, electronic books, etc.

BACKGROUND

Currently, a system management server can be installed in a connected mode. In that mode, the system management server may "call home" to the system management server provider's network or to any other proprietary service. That includes management of entitlements, allowing client machines to consume software channels and other services. The communication between the system management server and the system management server provider may be substantially continuous, or at least, frequent.

A conventional signed "certificate" is issued to the customer, which has the number of entitlements listed for each item. The numbers are then copied to the database tables and the system management server restricts access if the limit is reached. Nothing, however, prevents customers from tampering the database tables, such as increasing the raw numbers in the database tables to obtain more entitlements without paying for them.

BRIEF DESCRIPTION OF THE DRAWINGS

The present invention is illustrated by way of example, and not by way of limitation, in the figures of the accompanying drawings and in which.

DETAILED DESCRIPTION

Figure 1:
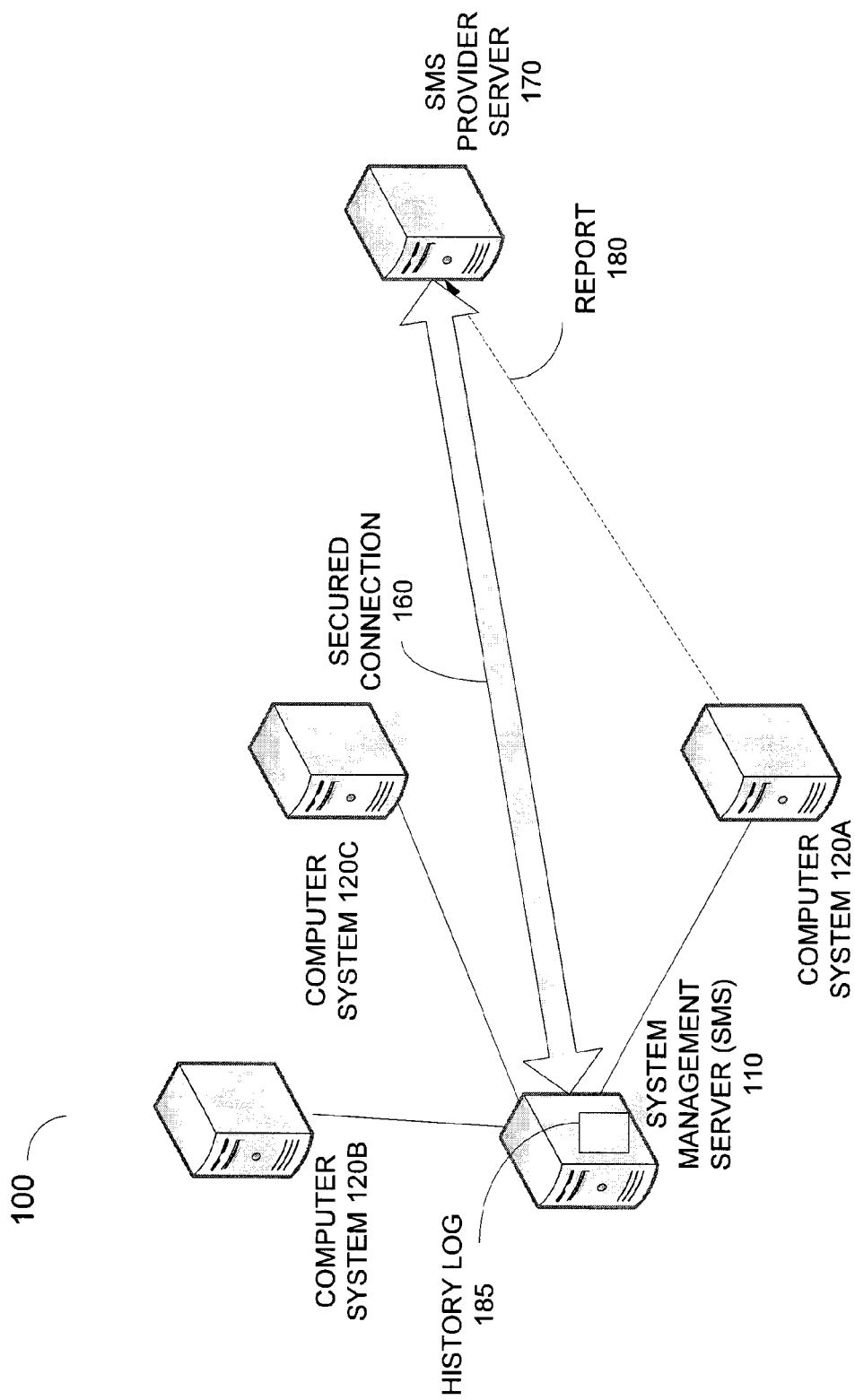
FIG. 1 illustrates one embodiment of a system usable in some embodiments of the invention.

Described herein are some embodiments of a method, an apparatus, and a system to verify compliance in a connected system. In some embodiments, a system typically includes a system management server and a set of computer systems. The system management server is provided by a software vendor (also referred to as the system management server provider), whereas the computer systems belong to the customer. The system management server manages the computer systems, such as determining what software, information, and/or services the computer systems are entitled to. The system management server may call home to a server of the software vendor (a.k.a. the provider server) from time to time. In some embodiments, the system management server may even maintain substantially continuous communication with the provider server. Thus, the system may be referred to as a connected system.

In some embodiments, the system management server can provide cryptographically timestamped hashes of states of the system management server to the software vendor periodically to allow the software vendor to verify compliance information from the customer later. A provider server of the software vendor may derive the states of the system management server and their corresponding times from the cryptographically timestamped hashes, and identify inconsistencies, if any, between the states of the system management server and the compliance information from the customer. More details of some embodiments of state-based compliance verification in a connected system are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "verifying" or "deriving" or "managing" or "providing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 4:
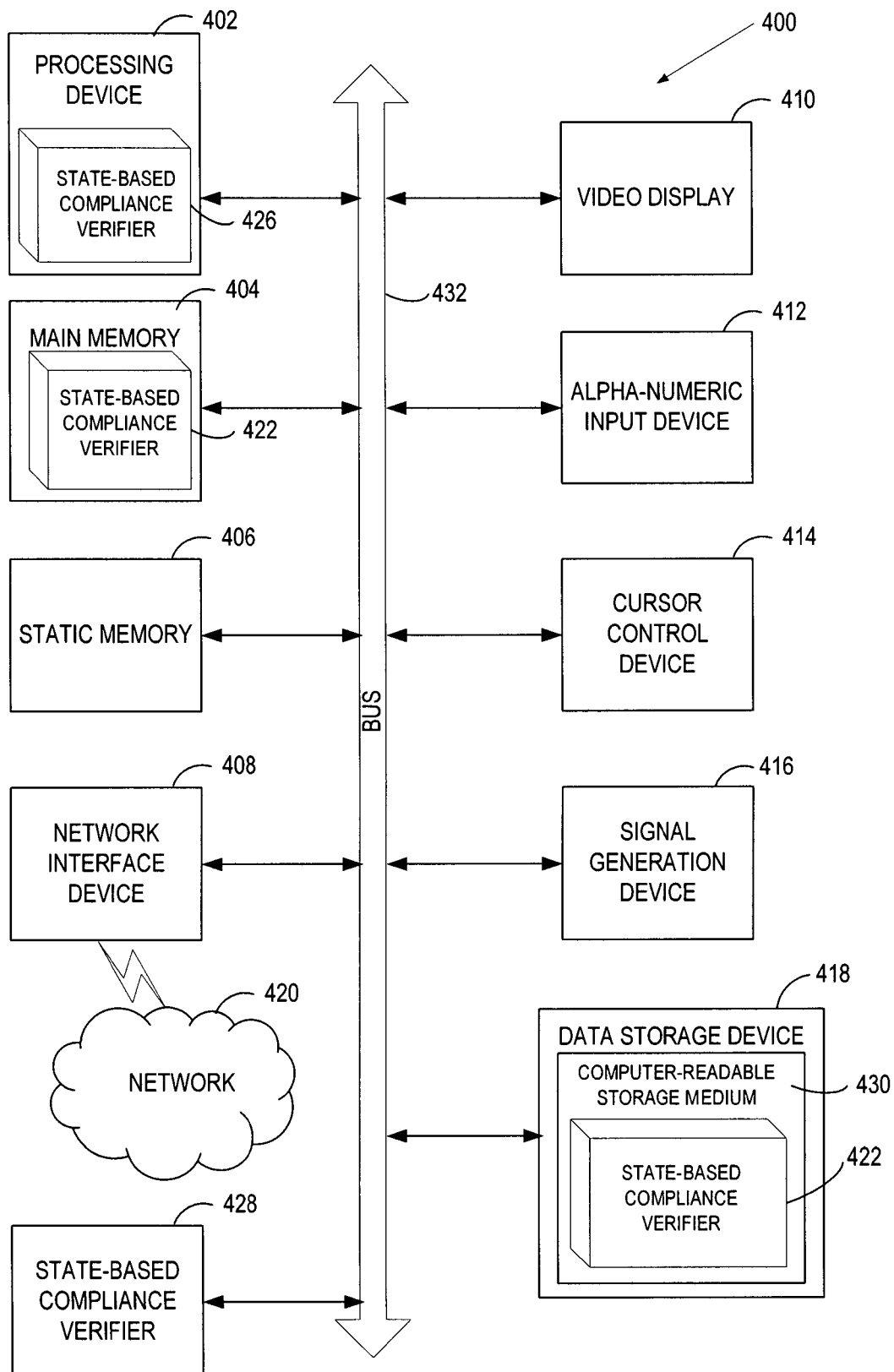
FIG. 4 illustrates a block diagram of an exemplary computing system.

FIG. 1 illustrates one embodiment of a system usable in some embodiments of the invention. The system 100 includes a system management server (SMS) 110, a number of computer systems 120A-120C, and a SMS provider server 170. The SMS 110, computer systems 120A-120C, and SMS provider server 170 may be implemented on one or more computing machines, such as a server computer, a desktop personal computer, a laptop computer, a personal digital assistant, etc. Details of one example of a computing machine are illustrated in FIG. 4. The SMS 110 and the computer systems 120A-120C may communicably couple to the SMS provider server 170 via a network, which may include a private network (e.g., a restricted local area network), and/or a public network, such as a wide area network (WAN), the Internet, etc. In some embodiments, a secured connection 160 (e.g., a virtual private network) can be established between the SMS 110 and the SMS provider server 170 over the public network. Thus, the system 100 may also be referred to as a connected system.

In some embodiments, the SMS 110 is used to manage computer systems 120A-120C. The computer systems 120A-120C are registered to the SMS 110, and the SMS 110 decides what services (such as management, provisioning, monitoring, etc.) and what information feeds (e.g., software and configuration channels, repositories, etc.) the computer systems 120A-120C are entitled to use and consume per an agreement (e.g., a license) previously established between the customer and the SMS provider. Because the SMS 110 is managed by the customer, the customer can potentially tamper with an entitlement database within the SMS 110, which stores the type and number of entitlements the customer is allowed. For example, the customer may increase the number of entitlements, which was granted and billed to the customer, in the entitlement database of the SMS 110. To increase the chance of detecting tampering of the entitlement database, and thus, to deter tampering of the entitlement database, dissemination of information about states of the SMS 110 can be used as discussed below.

In general, any time a new computer system interacts with the SMS 110 (e.g., to register with the SMS 110, or to obtain new service from the SMS 110), the state of the SMS 110 changes. The SMS 110 may take its state, including a list of computer systems registered at that moment (e.g., computer systems 120A-120C), the registered computer systems' entitlements, optionally including software and configuration channels, as well as a list of packages installed on the registered computer systems (as reported by the registered computer systems), format the above information, and then compute a hash of the formatted information using a cryptographically strong algorithm, such as SHA-2. The SMS 110 may optionally add a timestamp. The SMS 110 may further add a hash of the previous state of the SMS 110 to the hash in order to compute a final SMS state hash. In some embodiments, the hash computation is seeded by a random seed generated and stored on the SMS 110. Note that each SMS state hash describes and identifies a previous SMS state. Thus, the whole history of the SMS state can be derived from the last SMS state hash. The SMS state hash may represent all the information which might be important for compliance verification and billing purposes, together with full entitlement usage history, as each SMS state hash includes information of the previous SMS state.

In some embodiments, the SMS 110 sends the SMS state hash to the SMS provider server 170. Upon receipt of the SMS state hash, the SMS provider server 170 generates a cryptographical timestamp. For instance, the SMS provider server 170 may encrypt a timestamp using SHA-2. Alternatively, the SMS provider server 170 may combine a timestamp with the SMS state hash received, and then encrypt the combination using a cryptographical function. Then the SMS provider server 170 sends the cryptographical timestamp to the SMS 110. The SMS 110 stores the cryptographical timestamp along with the SMS state hash in a history log 185 hosted by one or more data storage devices (e.g., electronic devices, such as main memory, or mass storage devices, such as magnetic or optical storage based disks, tapes, or hard drives) of the SMS 110. This way, the burden of data storage is not on the SMS provider server 170, but rather on the customer. Note that the SMS 110 may timeout while waiting for the cryptographical timestamp from the SMS provider server 170 to avoid blocking the operation of the SMS 110. In some alternate embodiments, the SMS provider server 170 stores every SMS state hash that is submitted to it by the SMS 110 with its respective crypto graphical timestamp.

In some alternate embodiments, the SMS 110 and the SMS provider server 170 may occasionally communicate with each other, but not for every activity because of security and/or performance reasons. In this situation, the SMS 110 may obtain a cryptographical timestamp periodically (e.g., once a day) from the SMS provider server 170 and insert the cryptographical timestamp into the history log 185. Again, the time window for log tampering could be reduced since the last timestamping event.

In some embodiments, the customer submits a report 180 enumerating the usage of individual entitlements during a billing period (e.g., a week, a month, a quarter, etc.) at the end of the billing period. The customer may use one of the computer systems 120A-120C connected to the SMS 110 to generate the report 180. Then the customer may send the report 180 from one of the computer systems 120A-120C via an external network to the SMS provider server 170. Alternatively, the customer may use the SMS 110 to generate an entitlement usage report and send it to the provider server 170 via the SMS 110. In addition, the SMS 110 may send the history log 185 to the provider server 170 via the secured connection 160 if the provider server 170 does not store a copy of the SMS state hashes.

The SMS provider server 170 can then verify that usage of individual entitlements according to the report 180 is consistent with the SMS states at various times during the billing period as derived from the SMS state hashes and the cryptographical timestamps in the history log 185. The above compliance verification approach provides a convenient and secure way of tracking states of the SMS 110, and hence, indirectly tracking the entitlement usage by the computer systems 120A-120C.

The above approach reduces the time window in which customers can re-create or falsify the history log 185 for billing purposes later because it is difficult for the customers to re-create the log in real-time in which they want consistent records to appear in the history log 185. So it would be difficult for the customers to cheat at the time of submitting a support request to the SMS provider because it would be suspicious to the SMS provider that the support request is filed, for example, for a computer system which is claimed to have been upgraded from an older version of some licensed software (e.g., an operating system), and the upgrade failure is the alleged cause of the support request, while there is no previous record of the computer system's existence. In sum, it would be very difficult, if not impossible, for the customer to generate a history log that would look credible going back into history.

Figure 2A:
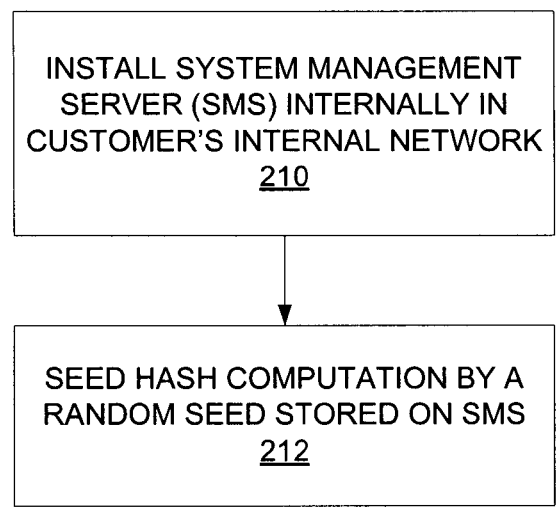
FIG. 2A illustrates a flow diagram of one embodiment of a method to prepare for compliance verification.

FIG. 2A illustrates a flow diagram of one embodiment of a method to prepare for compliance verification. The method may be performed by processing logic that may comprise hardware (e.g., circuitry, dedicated logic, programmable logic, microcode, etc.), software (such as instructions run on a processing device), firmware, or a combination thereof. For instance, the computing system 400 illustrated in FIG. 4 may perform at least part of the method in some embodiments.

Initially, processing logic installs a system management server (SMS) in a customer's networked system (processing block 210). The SMS manages computer systems in the customer's networked system as discussed above. Details of one embodiment of a SMS are further discussed below with reference to FIG. 3. Processing logic further seeds hash computation by a random seed stored on the SMS (processing block 212). For example, processing logic may randomly generate a number and store the number on the SMS, which can use the randomly generated number to compute hashes as discussed below.

Figure 2B:
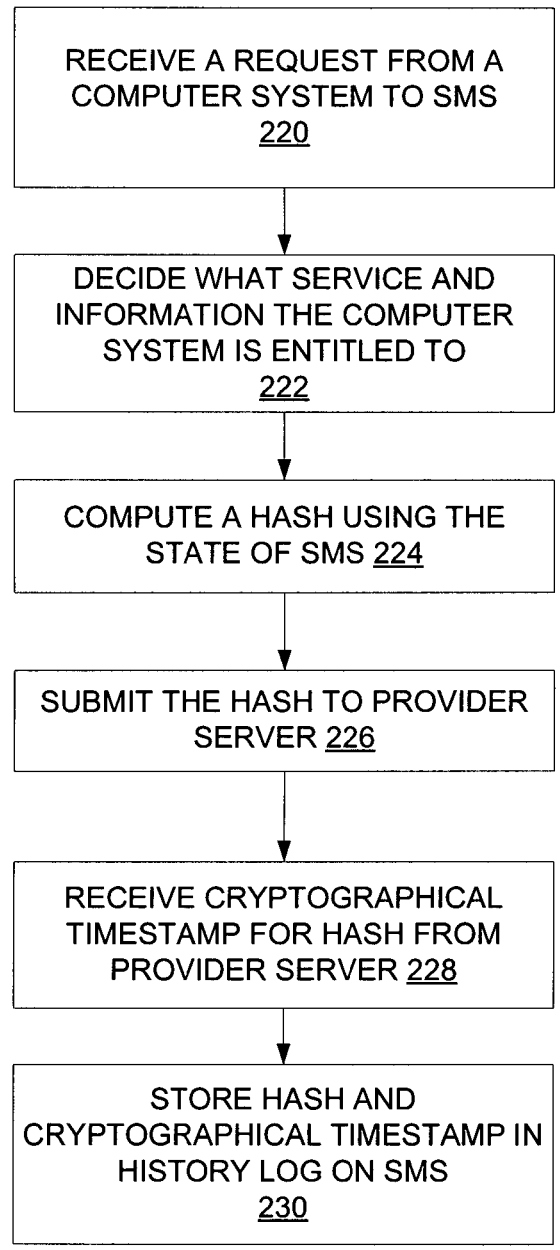
FIG. 2B illustrates a flow diagram of one embodiment of a method to create a history log in a system management server.

FIG. 2B illustrates a flow diagram of one embodiment of a method to create a history log in a SMS. The method may be performed by processing logic that may comprise hardware (e.g., circuitry, dedicated logic, programmable logic, microcode, etc.), software (such as instructions run on a processing device), firmware, or a combination thereof. For instance, the SMS 110 illustrated in FIG. 1 may perform at least part of the method in some embodiments.

Initially, processing logic receives a request from a computer system to the SMS (processing block 220). The computer systems belong to a customer of a provider of the SMS, such as the computer systems 120A-C illustrated in FIG. 1. The request may be a request to register the computer system with the SMS, a request to obtain service from the SMS, a request to access some specific information from the SMS, etc. Then processing logic decides what service and information the computer system is entitled to (processing block 222). For example, processing logic may check an entitlement database on the SMS to determine the service and information the computer system is entitled to. Then processing logic computes a hash using the current state of the SMS (processing block 224). The current state of the SMS may include current values of certain parameters stored in the SMS. Processing logic may add a timestamp, optionally, and further add a hash of the previous SMS state to the above hash of the current SMS state in order to compute a final SMS state hash.

In some embodiments, processing logic submits the final SMS state hash to a provider server, such as the SMS provider server 170 in FIG. 1 (processing block 226). In response, the provider server may encrypt a timestamp and send the encrypted timestamp to the SMS. When processing logic receives the encrypted timestamp (processing block 228), processing logic may store the final SMS state hash with the encrypted timestamp in a history log on the SMS (processing block 230). The history log may be used in compliance verification later as discussed below.

Figure 2C:
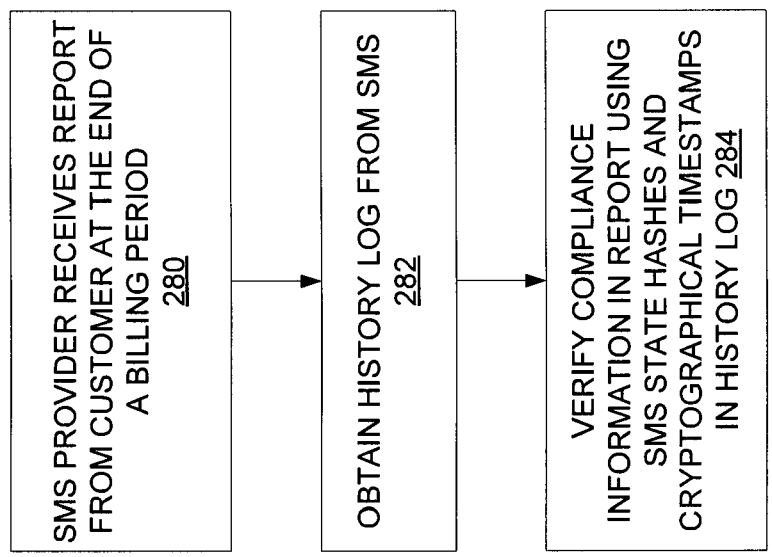
FIG. 2C illustrates a flow diagram of one embodiment of a method to verify compliance information from customers.

FIG. 2C illustrates a flow diagram of one embodiment of a method to verify compliance information from customers. The method may be performed by processing logic that may comprise hardware (e.g., circuitry, dedicated logic, programmable logic, microcode, etc.), software (such as instructions run on a processing device), firmware, or a combination thereof. For instance, the SMS provider server 170 illustrated in FIG. 1 may perform at least part of the method in some embodiments.

Initially, processing logic receives a report containing compliance information from a customer at the end of a billing period (processing block 280). Processing logic may further obtain a copy of a history log from a system management server (SMS) previously provided to the customer (processing block 282). The state of the SMS changes throughout the billing period, and hashes of the state computed at various time together with the corresponding encrypted timestamp are stored in the history log according to some embodiments of the invention discussed above. Using the hashes and the encrypted timestamps in the history log, processing logic verifies the compliance information in the customer's report (processing block 284). If there is any inconsistency between the compliance information in the report and the information derived from the history log (i.e., information derived from the SMS state hashes and timestamps), processing logic may alert the SMS provider and/or request the customer to submit additional information for further investigation.

Figure 3:
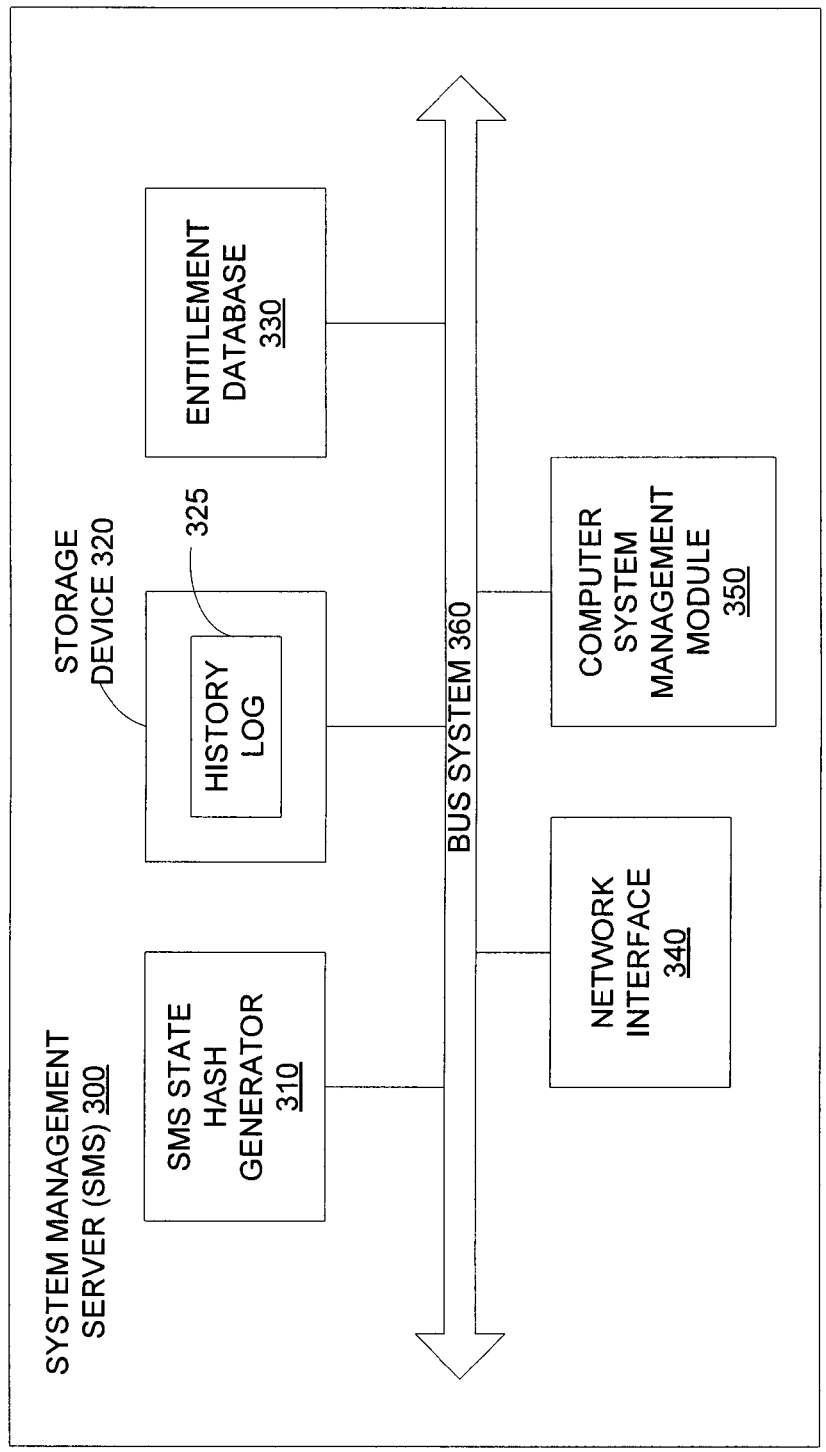
FIG. 3 illustrates one embodiment of a system management server.

FIG. 3 illustrates a block diagram of one embodiment of a system management server (SMS). The SMS 300 may be implemented with a computing machine, such as the one illustrated in FIG. 4. In general, a software vendor, also referred to as the SMS provider, provides the SMS to a customer to manage the customer's computer systems, such as the computer systems 120A-120C illustrated in FIG. 1. Referring to FIG. 3, the SMS 300 includes a SMS state hash generator 310, a storage device 320, an entitlement database 330, a network interface 340, and a computer system management module 350, coupled to each other via a bus system 360.

In some embodiments, the network interface 340 communicably coupled to a networked system of a customer in which the SMS 300 has been installed. The networked system may further include one or more computer systems, such as computer systems 120A-120C shown in FIG. 1. The network interface 340 may also be used to communicate with the SMS provider.

When a computer system in the customer's networked system initializes, the computer system may register with the SMS 300. The computer system management module 350 decides what service and information the computer system is entitled to by checking the entitlement database 330. For example, the entitlement database 330 may store the number of copies of a proprietary operating system the customer has licensed.

In some embodiments, the SMS state hash generator 310 uses a current state of the SMS 300, a timestamp, and a hash of a prior SMS state hash to generate a new SMS state hash. The SMS state hash generator 310 may employ a cryptographically strong hash algorithm, such as SHA-2, to generate the SMS state hash. Because there is no previous SMS state hash the first time the SMS state hash generator 310 computes the SMS state hash, the SMS state hash generator 310 may use a randomly generated seed stored in the storage device 320 instead. Note that the randomly generated seed is not provided to the customer's computer systems for security reason.

In some embodiments, the SMS 300 sends the newly computed SMS state hash to a SMS provider server, which cryptographically timestamps the SMS state hash and returns it to the SMS 300. The SMS 300 may store a copy of the cryptographically timestamped SMS state hash in a history log 325 in the storage device 320.

In some embodiments, the SMS state hash generator 310 generates a new SMS state hash every time the computer system accesses the SMS 300, and the SMS 300 sends the new SMS state hash to the SMS server provider via the network interface 340 to be cryptographically timestamped. The SMS 300, thus, stores a list of these cryptographically timestamped SMS state hashes in the history log 325. At the end of the billing period, the SMS 300 may send a copy of the history log 325 to the SMS provider. The SMS provider can use these cryptographically timestamped SMS state hashes to verify compliance information submitted by the customer as discussed above.

FIG. 4 illustrates a diagrammatic representation of a machine in the exemplary form of a computing system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the state-based compliance verifier 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., state-based compliance verifier 422) embodying any one or more of the methodologies or functions described herein. The state-based compliance verifier 422 may also reside, completely or at least partially, within the main memory 404 and/or within the processing device 402 during execution thereof by the computing system 400, the main memory 404 and the processing device 402 also constituting computer-accessible storage media. The state-based compliance verifier 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The state-based compliance verifier 428, components and other features described herein (for example, in relation to FIG. 1) can be implemented as discrete hardware components or integrated into the functionalities of hardware components, such as ASICS, FPGAs, DSPs, or similar devices. In addition, the state-based compliance verifier 428 can be implemented as firmware or functional circuitries within hardware devices. Further, the state-based compliance verifier 428 can be implemented in any combination of hardware devices and software components.

Thus, some embodiments of a system and a method to verify compliance in a connected system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   computing, by a processing device of a first server, a hash in view of a current state of the first server, the state comprising current parameter values stored by the first server;
   transmitting the hash to a second server;
   receiving an encrypted timestamp for the hash from the second server; and
   providing to the second server, by the first server, (i) the hash, (ii) the encrypted timestamp for the hash, and (iii) compliance information that can be verified in view of the hash and the encrypted timestamp.

2. The method of claim 1, further comprising:
   computing, by the first server, a new hash in view of the hash and a new state of the first server, wherein the new state of the first server comprises updated parameter values stored by the first server.

3. The method of claim 1, further comprising:
   storing the hash and the encrypted timestamp in a log.

4. A method comprising:
   obtaining, by a processing device of a first server, a log comprising hashes computed from states of a second server and encrypted timestamps associated with the hashes, wherein the second server is associated with a customer, wherein the states of the second server are in view of parameter values of the second server at the time the hash was computed; and verifying, by the first server, compliance information associated with the customer in view of the log and the states of a second server.

5. The method of claim 4, wherein the compliance information comprises entitlement usage by the customer during a billing period.

6. The method of claim 4, further comprising:
deriving, by the first server, a history of the second server states from the hashes and the encrypted timestamps in the log; and
identifying discrepancies, by the first server, between the compliance information and the history of the second server states.

7. The method of claim 4, further comprising:
billing, by the first server, the customer in view of the verified compliance information.

8. A non-transitory computer-readable storage medium comprising instructions to cause a processing device of a first server to:
compute, by the processing device of the first server, a hash in view of a current state of the first server, the state comprising current parameter values stored by the first server;
receive an encrypted timestamp for the hash from a second server; and
provide to the second server, by the first server, (i) the hash, (ii) the encrypted timestamp for the hash, and (iii) compliance information that can be verified in view of the hash and the encrypted timestamp.

9. The non-transitory computer-readable storage medium of claim 8, wherein the first server further to:
compute a new hash in view of the hash and a new state of the first server, wherein the new state of the first server comprises updated parameter values stored by the first server.

10. The non-transitory computer-readable storage medium of claim 8, wherein the first server to:
store the hash and the encrypted timestamp in a log.

11. A non-transitory computer-readable storage medium comprising instructions to cause a processing device of a first server to:
obtain a log comprising hashes computed from states of a second server and encrypted timestamps associated with the hashes, wherein the second server is associated with a customer, wherein the states of the second server are in view of parameter values of the second server at the time the hash was computed; and
verify, by the processing device, compliance information associated with the customer in view of the log.

12. The non-transitory computer-readable storage medium of claim 11, wherein the compliance information comprises entitlement usage by the customer during a billing period.

13. The non-transitory computer-readable storage medium of claim 11, wherein the first server is further to:
derive a history of the second server states from the hashes and the encrypted timestamps in the log; and
identify discrepancies between the compliance information and the history of the second server states.

14. The non-transitory computer-readable storage medium of claim 11, wherein the first server is further to bill the customer in view of the verified compliance information.

15. A first server, comprising:
a network interface; and
a processing device operatively coupled to the network interface, the processing device to:
compute a hash from a current state of the first server, the state comprising current parameter values stored by the first server,
transmit, via the network interface, the hash to a second server,
receive from the second server, via the network interface, an encrypted timestamp for the hash, and
provide to the second server (i) the hash, (ii) the encrypted timestamp for the hash, and (iii) compliance information that can be verified in view of the hash and the encrypted timestamp.

16. The first server of claim 15, further comprising:
a storage device operatively coupled to the network interface, to store the hash and the encrypted timestamp.

17. The first server of claim 15, further comprising:
an entitlement database coupled to the network interface, to store an indication of what service and information the first server is entitled to.

18. The first server of claim 15, wherein the hash is computed via a SHA-2 hash function.

* * * * *